United States Patent [19]

Okubo et al.

[11] 4,193,474
[45] Mar. 18, 1980

[54] SOUND INSULATING UNIT AND SOUND BARRIER

[75] Inventors: Katsuyuki Okubo, Osaka; Nobuyasu Ueda, Hyogo; Tetsumi Ono, Chiba, all of Japan

[73] Assignee: Toray Industries, Inc., Tokyo, Japan

[21] Appl. No.: 895,391

[22] Filed: Apr. 11, 1978

[51] Int. Cl.² .................... E04B 1/343; E04B 1/82; C04B 43/00
[52] U.S. Cl. .................... 181/287; 181/290; 181/294; 428/58; 428/33; 428/70; 428/921; 428/246
[58] Field of Search ............ 181/30, 201–207, 181/209, 210, 284–290, 294, 295, 200; 160/105, 123, 124, 126, DIG. 12, 135, 351; 428/328, 33, 58, 70, 218, 246, 920, 921; 52/144, 145

[56] References Cited

U.S. PATENT DOCUMENTS

| | | | |
|---|---|---|---|
| 1,671,208 | 5/1928 | Rosenblatt et al. | 181/284 |
| 3,127,668 | 4/1964 | Troy | 428/605 |
| 3,138,837 | 6/1964 | Weeton et al. | 228/178 |
| 3,161,258 | 12/1964 | Chapman | 181/287 |
| 3,231,042 | 1/1966 | Chapman | 181/287 |
| 3,231,341 | 1/1966 | Sump et al. | 428/296 |
| 3,298,457 | 1/1967 | Warnaka | 181/290 |
| 3,342,036 | 9/1967 | Gruget | 428/328 |
| 3,424,270 | 5/1965 | Hartman et al. | 181/294 |
| 3,437,457 | 4/1969 | Fisher | 428/605 |
| 3,469,297 | 9/1969 | Webber | 428/605 |
| 3,589,971 | 6/1971 | Reed | 181/200 |
| 3,596,701 | 8/1971 | Cowan | 160/135 |
| 3,727,292 | 4/1973 | Nicely | 29/419 R |
| 3,793,700 | 2/1974 | Maikish et al. | 29/419 R |
| 3,811,976 | 5/1974 | Schlomer et al. | 156/62.8 |
| 3,822,764 | 7/1974 | Val | 181/286 |
| 3,823,794 | 7/1974 | Bre | 181/286 |
| 3,851,724 | 12/1974 | Banks, Jr. | 181/208 |
| 3,876,034 | 4/1975 | Antonini | 181/208 |
| 3,895,143 | 7/1975 | Tarlow | 181/294 |
| 4,015,386 | 4/1977 | Cook | 428/70 |
| 4,119,755 | 10/1978 | Hoyer | 428/920 |

*Primary Examiner*—L. T. Hix
*Assistant Examiner*—Benjamin R. Fuller
*Attorney, Agent, or Firm*—Miller & Prestia

[57] ABSTRACT

Sound insulating units and sound barriers made therefrom include at least one flexible sheet having a surface density of at least 2.0 Kg/cm². Such sheets are capable of being connected to form an efficient sound barrier.

14 Claims, 22 Drawing Figures

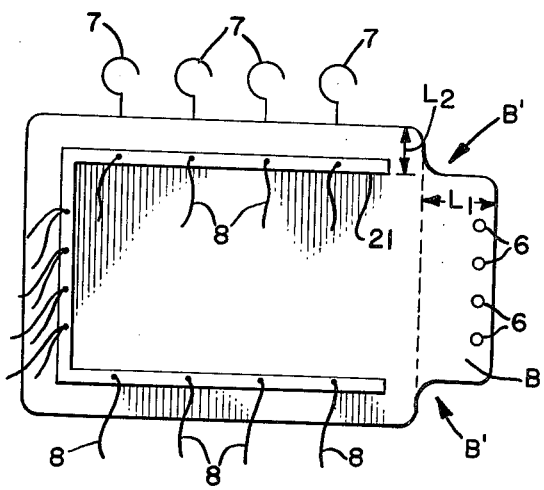
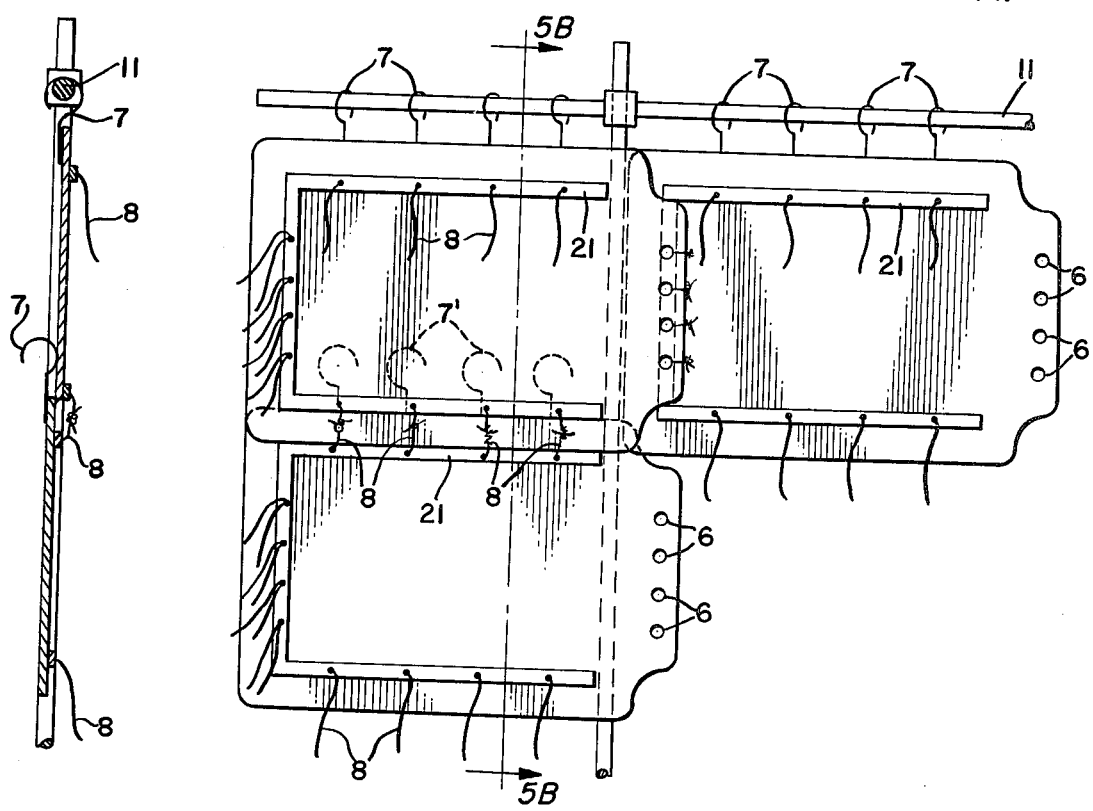

SOUND INSULATING UNIT AND SOUND BARRIER

BACKGROUND OF THE INVENTION

This invention relates to flexible sound insulating units, and to sound barriers utilizing such units.

Various measures have heretofore been taken to control noise, such as by the reduction in the generation of noise at its source, enclosing the sound source and insulating against airborne noise.

Reduction in the generation of sound, as from machines or the like, has been in progress by use of improved materials and by modifying the construction of the machines. On the other hand, heavy and hard materials such as steel, concrete and the like have been commonly used as permanent sound insulators. However, these materials are not suitable for temporary sound insulation, i.e., the control of noise for construction sites, machines used for a short period, and the like. Such hard and heavy materials are not easily fabricated into soundproof structures of complicated shape. For example, sound insulating panels consisting of wire nets and sound insulating plates have been used at construction sites by placing them on scaffolding or metal frames. The drawbacks of such panels are that noise leaks occur through gaps that exist between the panels. Also, they are costly to form, can easily be broken and are difficult to use.

It is an object of the present invention to provide sound insulating units and barriers which are easy to use and possess excellent insulating capabilities.

In accordance with the present invention, the sound insulating unit includes a flexible sheet having a surface density of at least 2.0 Kg/cm² which is capable of overlapping with similar flexible sheets, at least in the area where the sheet is connected to a supporting means. This invention also provides a sound barrier which is formed with the aforementioned sound insulating sheets.

BRIEF DESCRIPTION OF THE DRAWINGS

Further objects and advantages of the sound insulating units and barriers of this invention will become more apparent from the following description and accompanying drawings wherein:

FIG. 3A is a top plan view of one form of sound barrier in accordance with the invention FIG. 3B is a top plan view of another form of sound barrier of the invention;

FIG. 3C is a top plan view of a still another form of sound barrier of the invention;

FIG. 4 is a plan view of another form of sound insulating unit of the invention;

FIG. 5A is a plan view of a sound barrier formed by linking the sound insulating units of FIG. 4;

FIG. 5B is a side view of the sound barrier of FIG. 5A taken along line A—A;

DESCRIPTION OF THE PREFERRED EMBODIMENTS

Figure 1A:
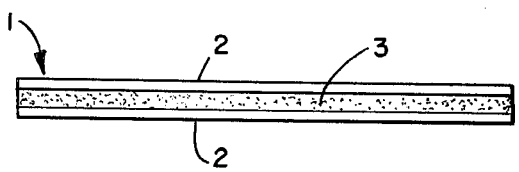
FIG. 1A is a side view of one form of sound insulating unit of this invention.

As seen in FIG. 1A, a sound insulating unit 1 may be formed by attaching high strength sheets 2 to both surfaces of high density sheet material 3.

Figure 1B:
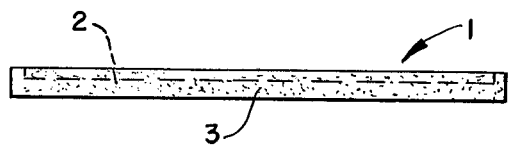
FIG. 1B illustrates another form of sound insulating unit of this invention.

Alternatively, the sound insulating unit may be formed by embedding a high strength sheet 2 in a high density sheet 3, as shown in FIG. 1B.

Figure 1C:
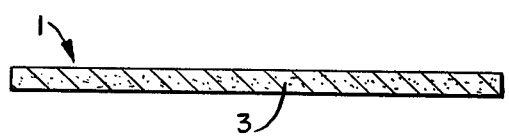
FIG. 1C is a side view of a further form of the sound insulating unit of this invention.

Also, as shown in FIG. 1C, the sound insulating unit 1 may consist solely of a sheet 3, which should have a surface density of 2.0 Kg/cm² or more, so as to reduce the energy of airborne sound by a satisfactory amount.

It has been found that the higher the surface density, the more the noise is reduced. However, a sheet having a surface density of from 2.0 Kg/m² to 6.0 Kg/m² is most preferable in view of its ease of handling and high insulating capacity. A suitable high surface density sheet for use in the present invention can be obtained by combining polymeric material with high density materials. Any polymeric material which can form a flexible sheet may be used in the present invention.

Suitable polymeric materials include polyesters, polyamides, polyethers, polyurethanes, polyureas, polycarbonates, and polyvinyl acetals such as polyvinyl formal, homopolymers and copolymers of ethylenically unsaturated compounds including vinyl compounds and olefins such as ethylene, propylene, tetrafluoroethylene, acrylonitrile, vinyl chloride, methyl methacrylate and vinylidene chloride, silicones, polysulfides, rubbers including natural rubber, Neoprenes (polychloroprene and various chloroprene copolymers), acrylonitrile-styrene rubber, styrene-butadiene rubber, acrylonitrile butadiene rubber, butyl rubber and ethylene-propylene rubber and synthetic inorganic polymers such as a siloxane polymer and inorganic rubber.

These polymers may be used alone or in combination. Suitable additives such as plasticizers, flame retardants, pigments, dyes, stabilizers, extenders and ultraviolet absorbers may be incorporated into such polymer materials.

High density materials used in this invention are metals and/or inorganic compounds which are in the form of a powder or fiber of a fabricated substance.

Metals suitable for use in this invention include lead, zinc, iron, tin, nickel, copper, chromium, or mixtures thereof. However, other suitable substances may be added such as magnesium, silver antimony, bismuth, aluminum, silicon, carbon, etc.

Examples of inorganic compounds which can be used in this invention include oxides of iron, lead, aluminum, copper, magnesium, antimony, bismuth, tin, titanium and manganese; the hydroxides of iron, lead, barium, magnesium or aluminum; the carbonates of zinc, calcium, iron, lead, barium and magnesium; the sulfides of zinc, iron, copper, lead and bismuth; the sulphates of lead, barium; the phosphates of calcium or lead; the silicates of calcium or magnesium; the carbides of silicon and boron; boron nitride, silica, carbon and ores.

Lead is the most suitable for use in sound insulation because of its high density. However, fine lead powder may contaminate the working area and tends to be oxidized to the lower density oxide.

To avoid such drawbacks, lead is preferably melt-spun to form flexible fibers with a diameter in the range of $30\mu$ to $200\mu$ and a length of 1 mm to 1 m. Another advantage of employing lead fibers is that a sheet containing lead fibers is crack-resistant when folded, whereas a sheet containing a high amount of lead powder, such as about 60 weight %, cracks easily. This crack resistance is important. Although it is easy to increase the strength of the sound insulating sheet by incorporating a high strength cloth into it, cracking cannot be avoided by such means.

The flexible sheet 3 (that is high density sheet), which is suitable for use in fabricating the sound insulating unit of the present invention, has good sound insulating properties with respect to an effective overall audible frequency band and shows no decline in sound insulation characteristics resulting from the coincidence effect as observed on concrete, steel panels, plywood boards, etc.

Figure 1D:
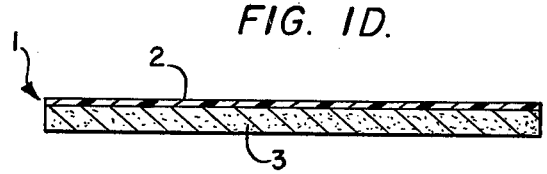
FIG. 1D is a side view of still another form of sound insulating unit of this invention.

To improve the tensile strength of the sound insulating unit 1 of the present invention, a high density sheet 3 can be incorporated with a high strength sheet 2 such as a coated fabric, nonwoven fabric or film, as shown for example in FIGS. 1A, 1B and 1D. The high strength sheet 2 may be attached on the surface of the high density sheet 3 by any known means such as a heat press, sewing or bonding with adhesives.

Figure 1E:
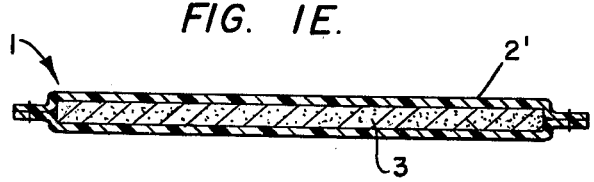
FIG. 1E is a side view of a still further form of sound insulating unit of this invention.

The high density sheet of the sound insulating unit may be covered with an envelope 2' to form a composite sheet as shown in FIG. 1E. Such an envelope may be made of a fabric or a film. In such cases, it is required that the surface density of said composite sheet with high strength sheet 2 must be at least 2.0 Kg/m². Accordingly, it is feasible that the sole surface density of said flexible sheet may be less than 2.0 Kg/m².

The sound insulating unit of this invention may be used in the formation of a sound barrier by arranging plurality of the units in such a manner that a part of each unit can be partially overlapped with another along a suitable supporting means such as a net or frame. The supporting means may be metal or plastic rods or pipes or wooden rods, for example.

It is important to construct a sound barrier without gaps or openings at the point where the sound insulating units are connected to each other in order to prevent leakage of noise.

Figure 2B:
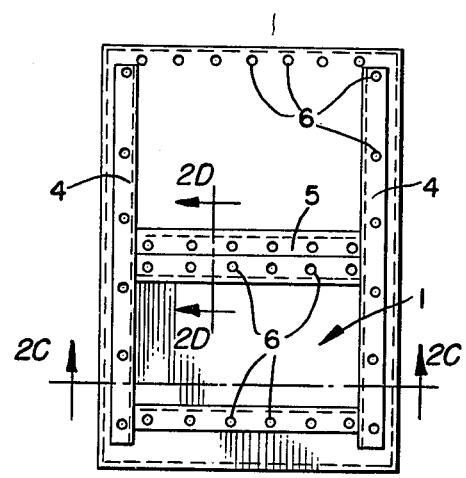
FIG. 2B is a rear plan view of the unit of FIG. 2A.
Figure 2A:
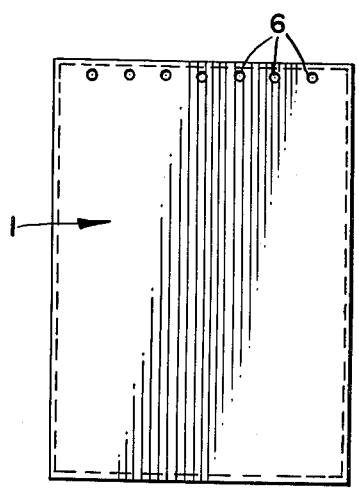
FIG. 2A is a front plan view of a sound insulating unit of the invention.
Figure 2C:
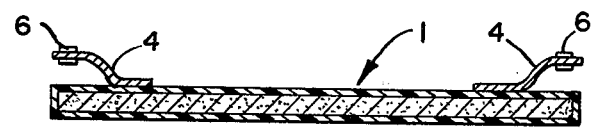
FIGS. 2C and 2D are side views of the unit shown in FIG. 2B taken along lines B—B and C—C, respectively.
Figure 2D:

An example of a sound insulating unit 1 of the invention is shown in FIGS. 2A, 2B and 2C. FIG. 2A shows the front plan view of a sound insulating unit with eyelets 6. As shown in FIG. 2B, the rear portion of the unit is provided with a supplementary strip 4 having eyelets 6 for linking the units. In specific cases, the units are provided with a frame holding strip 5 having eyelets 6 on the center of the unit. Both strips 4 and 5 of the unit may consist of either a film or fabric.

Figure 3A:
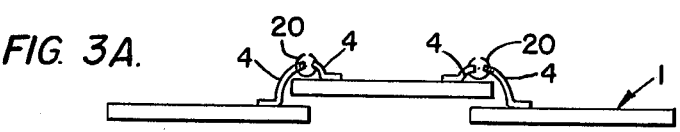
FIGS. 3A, 3B and 3C illustrate one form of apertures for linking together the sound insulating units of the invention.

By connecting the supplementary linking strip 4 with ropes, hooks, fasteners, or bonding tapes the sound insulating units are unified with overlap so as to form the sound barrier shown in FIG. 3A.

Figure 3B:
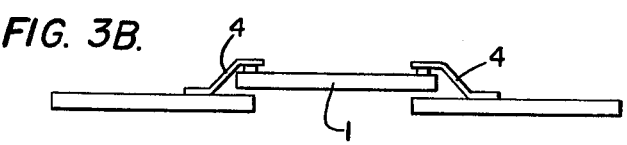
Figure 3C:
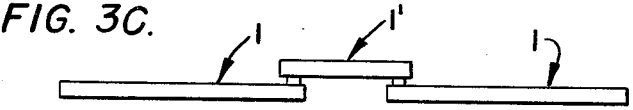

One kind of sound insulating unit with a supplementary linking strip may be connected to another kind of unit without a linking sheet by using connecting devices such as hooks, fasteners, bonding tape or a rope as shown in FIG. 3B. As shown in FIG. 3C, a gap between the sound insulating units may be covered by connecting the units with a third sheet 1' having a surface density of 2.0 Kg/cm² or more.

FIG. 4 illustrates another type of sound insulating unit that may be used in forming a sound barrier. As noted, hook members 7 may be provided on the top edge of the unit together with band or thread means 8 for connection with another sound insulating unit. Band or thread means 8 may be provided along the line 21 located slightly inside of the outer edges of the unit. Moreover, a projecting portion B that projects from the normal edge-line and has several eyelets 6 may also be provided. FIGS. 5A and 5B show a sound barrier consisting of such a unit. As noted in FIG. 5A, hook members 7 that are provided on the upper edge of the unit are hooked on the frame 11 and each unit overlaps and is connected with the other by means of a band 8. If necessary, hook members 7' of another unit are hooked to a separate support. In FIG. 5A, hook members 7' on the unit in the second line are free from the frame and all of the units are connected with each other by means of a rope. In such a case, rod or pipe is used as the supporting means although a wire net can be used instead.

In a construction site, various types of frames are ordinarily used for supporting sheets. Sometimes such frames may be constructed of a front side portion composed of a vertical pipe 12 and a horizontal pipe 11, and also including a back portion substantially the same as the front side, together with connecting rods 13 which connect the front and back portions and are arranged at right angles to the planes formed by the pipes 11 and 12. However, in this type of frame, it is very difficult to connect the sound insulating units to the frame because the top edges P of the rods 13 project from the front surface of the frame. The projection of the top edge 13 constitutes an obstacle impeding a connection of the unit to the frame.

Figure 9:
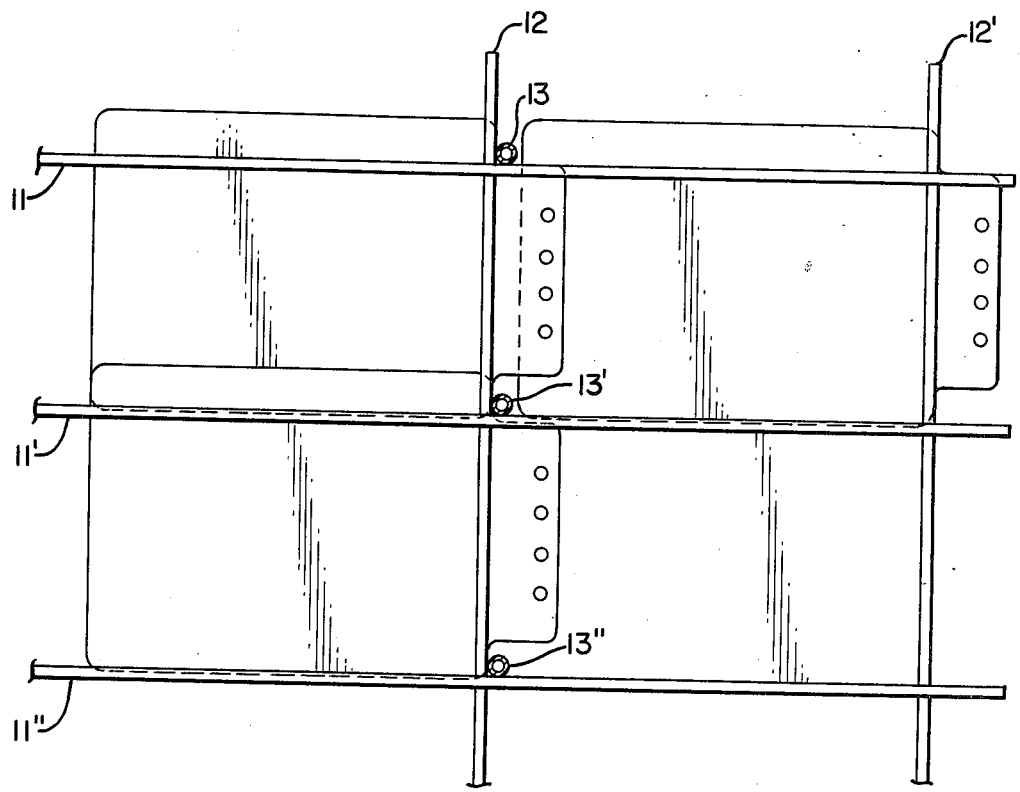
FIG. 9 illustrates another type of sound insulating barrier.
Figure 10:
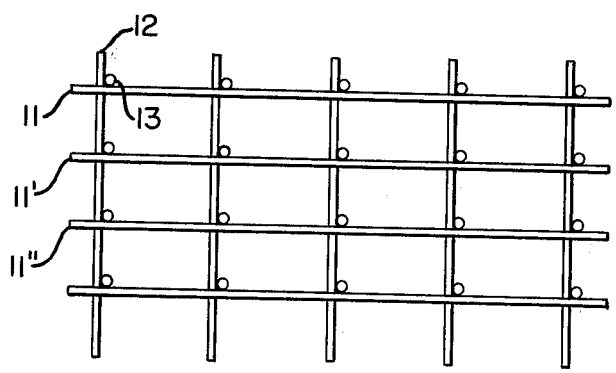
FIGS. 10 and 11 illustrate a frame for supporting sheets used in FIG. 9.
Figure 11:
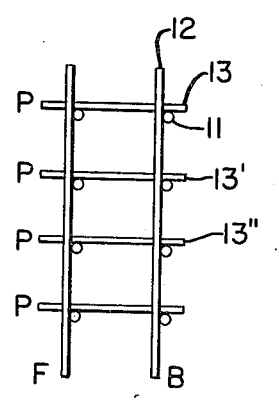

Accordingly, the sound insulating unit is provided with projecting portion B and a cut away portion B'. A sound barrier constructed of such units is shown in FIG. 9 of the drawings. Referring to FIG. 9, the projecting length $L_1$ of the unit can be easily determined by considering the amount of the overlap. However, when the pipe frame is used as a supporting means, the length $L_1$ is preferably greater than twice the diameter of the frame pipe. On the other hand, the cut away length $L_2$ of the projecting portion of the unit is approximately equal to the diameter of that frame pipe.

Figure 6:
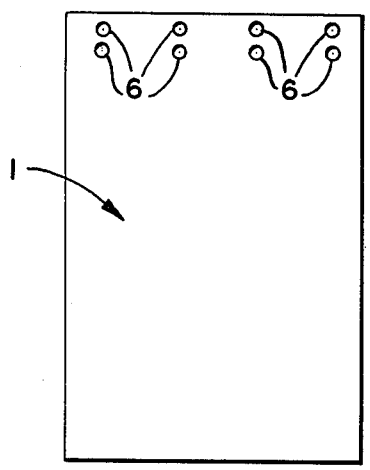
FIG. 6 is a plan view of another form of sound insulating unit of this invention.
Figure 7A:
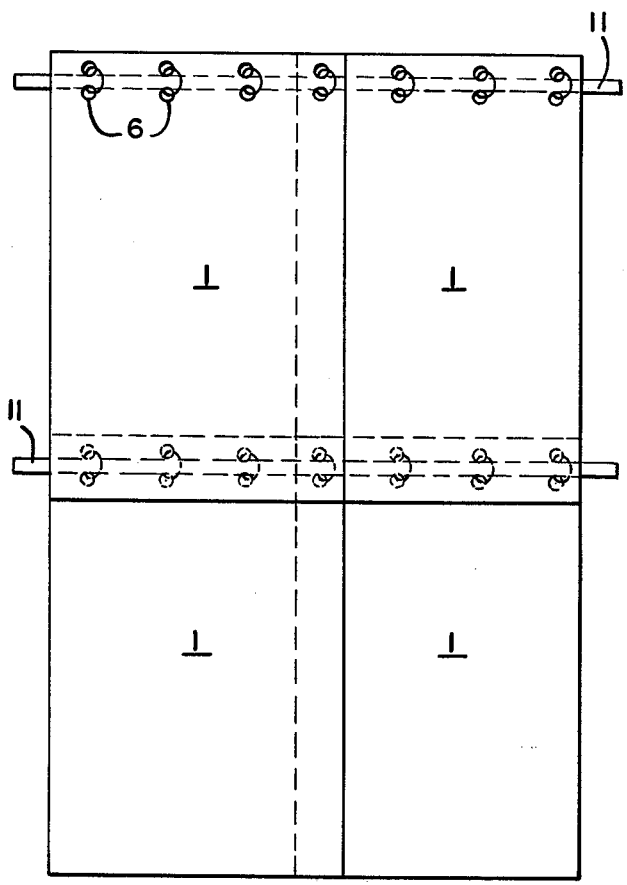
FIG. 7A is a plan view of a sound barrier formed with sound insulating units of the type shown in FIG. 6.
Figure 7B:
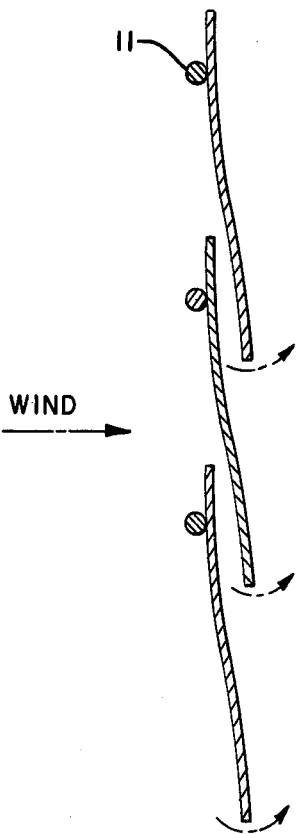
FIG. 7B illustrates the movement of the sound insulating units of FIG. 7A when blown by a strong wind.

FIG. 6 shows an example of sound insulating units wherein the units are connected only at the upper part of the unit to a frame 11 as shown in FIG. 7A. In this case, all sides are arranged so as to overlap and form a sound barrier. The sound barrier thus formed is useful if strong winds are expected especially from one direction, for example, when blasting in a tunnel. Then, all of the units can be pivoted at the contact point of the hook and frame so that the shock wave can be eliminated through the gaps that form among the units, reference FIG. 7B.

Another advantage of such a unit is that it can be connected to a supporting means with a curved surface so as to form a sound barrier with the curved surface, if necessary. This feature is advantageous since only one side of the flexible sound insulating unit is fixed to the frame.

As previously mentioned, the sound insulating units and sound insulating barriers can be used on the construction site as well as for temporary use with noisy machines, or working areas.

It is understood that the units of this invention are not restricted to any particular size. The units can take any size depending upon the use intended. For example, if the unit is to be used as a sound barrier for construction sites, units of 1m in length and 2m in width can be adopted. In such a unit the eyelets for connecting the device can be provided along the edge of the unit in place of the example shown in FIG. 2A. Further supplemental eyelets may be provided on the middle portion of this unit for connection to a supplemental frame rod midway between the upper and lower connecting means.

Similarly, a supplemental sheet for connection with a frame rod may be provided along the middle portion of the unit as shown in FIG. 2.

The following Examples are given in order further to illustrate the invention, but are not intended to limit its scope.

EXAMPLE 1

A high density sheet having a thickness of 0.6 mm and a surface density of 1.2 Kg/m$^2$ was prepared by mixing natural rubber/styrene-butadiene rubber (NB/SBR) with a similar amount by weight of a fine lead oxide powder (litharge). The sheet thus obtained was cut to a size of 1.97 m × 1.80 m and stitched together with a fire-retardant nylon-tarpaulin sheet to form a sound insulating sheet having a surface density of 2.0 Kg/m$^2$, such a sheet as shown in FIG. 1A. The sound insulating sheet is provided with eyelets at about 20 cm intervals, and is provided with supplementary linking cloths and a steel pipe holding cloths 5, as shown in FIG. 2B.

The sound insulating units thus obtained were connected to each other according to the arrangement shown in FIG. 3A and were hung from the ceiling surrounding a press machine. The reduction of noise was found to be 13 dBA.

EXAMPLE 2

A lead fiber non-woven fabric having a surface density of 2.5 Kg/m$^2$ and a polyester cloth were embedded in soft polyvinyl chloride so as to form a high density sheet having a surface density of 3.7 Kg/m$^2$. In the same manner as described in Example 1, the sheet was used to form sound insulating units having a dimension of 1.97 m × 3.50 m. The units thus obtained were connected to each other and fastened to a steel pipe support of scaffoldings with a height of 7 m surrounding a construction site using supplementary linking cloths and a steel pipe support holding the cloths. The noise reduction attained was found to be about 18 dBA.

EXAMPLE 3

A high density sheet having a surface density of 6 Kg/m$^2$ consisted of equal amounts by weight of barium sulfate powder and soft polyvinyl chloride. This high density sheet was reinforced with a nylon cloth fixed to its surface. By using the sound insulating sheet thus formed, a similar type of sound insulating unit as shown in FIGS. 2A and 2B was obtained having dimensions of 1.0 m × 6.0 m. Connecting ropes were provided at 20 cm intervals along a line 3 cm inside of the side edge of the unit. Sound insulating units were obtained by connecting such units with a sheet 1' having a different shape, and having dimensions of 0.3 m × 6.0 m in the manner shown in FIG. 3C. The units thus formed were suspended from the ceiling around a compressor. The noise reduction attained was about 23 dBA.

EXAMPLE 4

The sound insulating unit shown in FIG. 4, was prepared by using a sound insulating sheet having a surface density of 3.7 kg/m$^2$ and a thickness of 1.2mm which was reinforced by a polyester cloth embedded in a soft polyvinyl chloride sheet containing lead fibers having a length in the range of 1 mm–5 mm. This unit had a tongue portion B projecting out of its right hand edge portion, for overlapping purposes, and hooks connecting rope or wires and eyelets as shown in FIG. 4. The sound insulating unit was conveniently used at a construction site with scaffolding having pipes extending perpendicular to the vertical plane formed by vertically and horizontally arranged pipes as shown in FIG. 9.

EXAMPLE 5

Lead fibers were embedded in a sheet of ethylene-vinylacetate copolymer having a thickness of 1.0 mm and a surface density of 3.0 Kg/m$^2$. The sheet was reinforced by laminating on both surfaces with a polyester spunbonded fabric having a surface density of 50 g/m$^2$. The eyelets were arranged as shown in FIG. 6. The sheets were fastened with an overlap about 10 cm wide to a frame placed to form a sound barrier at the entrance of a tunnel under construction. The shock waves resulting from dynamite blasting in the tunnel were attenuated by the sound barrier with a noise reduction of about 10 dBA.

EXAMPLE 6

Figure 8:
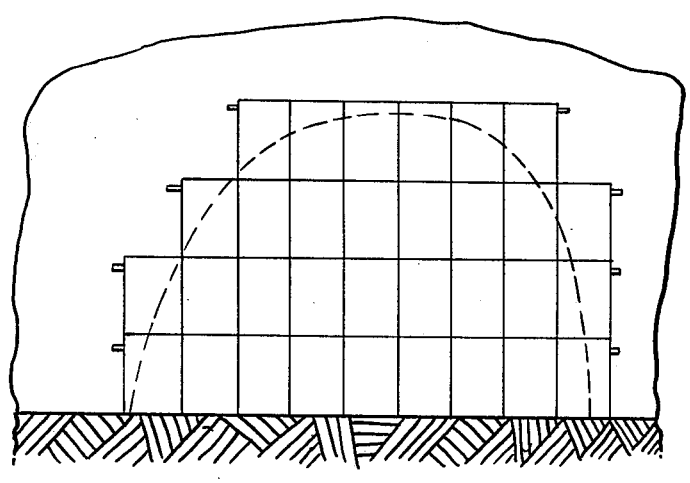
FIG. 8 illustrates the sound barrier as used at the entrance of a tunnel.

The same sound insulating units as shown in FIG. 4 were used as a sound barrier, except that connecting ropes were used, and the sheet had a surface density of 3.0 Kg/m$^2$. The sound barrier was erected at the entrance of a tunnel in which blasting with dynamite was taking place. In this case, a supporting frame was set up with a plurality of metal pipes which were arranged in vertical and horizontal directions, and a strong wire net covered one surface of this supporting frame. The units were arranged over said net by placing its hooks on the wire of the net in such a condition that the edges of the units slightly overlapped, as shown in FIG. 8.

The dynamite blasting which took place about 100 m away from the entrance of the tunnel was reduced 100 dBA to 80 dBA.

While the foregoing constitutes a detailed description of the preferred embodiments of the present invention, it is recognized that modifications thereof will occur to those skilled in the art. Accordingly, the scope of the invention is to be limited solely by the scope of the appended claims.

We claim:

1. A sound insulating unit comprising:
a flexible sheet of a polymeric material and a high density inorganic material, said inorganic material being in the form of a powder or fiber, said sheet having a surface density of at least 2.0 Kg/m², and means for connecting and detaching said unit to at least another of said unit, said connecting and detaching means affixed to said unit, wherein said connecting and detaching means being adapted for overlapping of the edges of said units being connected to each other and preventing sound leakage from the overlapping portion.

2. The unit according to claim 1, wherein said flexible sheet comprises an elastomeric material selected from at least one homopolymer, copolymer of ethylenically unsaturated compounds and rubber, and said high density matter being selected from the group consisting of lead, iron, oxide of iron, oxide of lead, sulfate of lead, and ore.

3. The unit according to claim 1, wherein said flexible sheet comprises a non-woven fabric of lead fiber and polyvinyl chloride.

4. The unit according to claim 1, wherein at least one high strength sheet-like material is embedded in said flexible sheet.

5. The unit according to claim 1, wherein at least one high strength sheet-like material is attached to at least one surface of said flexible sheet.

6. The unit according to claim 1, including means for connecting said unit to a support.

7. A sound insulating unit according to claim 1, wherein the means for connecting are supplementary linking strips having eyelets therethrough.

8. A sound insulating unit according to claim 1, wherein the means for connecting are supplementary linking strips having hooks thereon.

9. A sound insulating unit according to claim 1, wherein the means for connecting are supplementary linking strips having fasteners thereon.

10. A sound insulating unit comprising:
a high density sheet of natural rubber and styrene-butadiene rubber, lead oxide powder embedded within said sheet, fire retardant nylon tarpaulin sheet attached to said high density sheet, and means for attaching said unit on a support, said high density sheet with said nylon tarpaulin having a surface density of at least 2.0 Kg/m².

11. A sound insulating barrier comprising:
a plurality of overlapping flexible sheets, said sheets of a polymeric material and high density inorganic material in the form of a powder or fiber, said sheets having a surface density of at least 2.0 Kg/m², each of said sheets having means for connecting said sheet to at least another of said sheets, wherein each sheet is connected to another sheet by said connecting means so that each of said sheets is partially overlapping an adjacent sheet.

12. The barrier according to claim 11, wherein each sheet partially overlaps with an adjacent sheet and each side of said sheet is connected to another sheet.

13. The barrier according to claim 12, wherein a plurality of said sheets are connected to a support means.

14. The barrier of claim 11, wherein at least one high strength sheet is attached to each flexible sheet.

* * * * *

UNITED STATES PATENT AND TRADEMARK OFFICE
CERTIFICATE OF CORRECTION

PATENT NO. : 4,193,474
DATED : March 18, 1980
INVENTOR(S) : Katsuyuki Okubo et al It is certified that error appears in the above-identified patent and that said Letters Patent are hereby corrected as shown below:

Column 4, line 11, "sheet" should read --strip--.

Signed and Sealed this

Twelfth Day of August 1980

[SEAL]

Attest:

SIDNEY A. DIAMOND

Attesting Officer

Commissioner of Patents and Trademarks